United States Patent
Lin et al.

(10) Patent No.: US 11,881,037 B2
(45) Date of Patent: Jan. 23, 2024

(54) AUTOMATICALLY DETECTING METHOD FOR TIME-VARYING TEXT REGION OF INTEREST

(71) Applicant: ADLINK TECHNOLOGY INC., New Taipei (TW)

(72) Inventors: Chien-Chung Lin, New Taipei (TW); Wei-Jyun Tu, New Taipei (TW); Yu-Yen Chen, New Taipei (TW)

(73) Assignee: ADLINK TECHNOLOGY INC., New Taipei (TW)

( * ) Notice: Subject to any disclaimer, the term of this patent is extended or adjusted under 35 U.S.C. 154(b) by 387 days.

(21) Appl. No.: 17/168,773

(22) Filed: Feb. 5, 2021

(65) Prior Publication Data
US 2022/0253636 A1  Aug. 11, 2022

(51) Int. Cl.
*G06V 20/62*  (2022.01)
*G06T 7/143*  (2017.01)
*G06T 7/187*  (2017.01)
*G06V 10/75*  (2022.01)
*G06V 30/146*  (2022.01)

(52) U.S. Cl.
CPC ............. *G06V 20/62* (2022.01); *G06T 7/143* (2017.01); *G06T 7/187* (2017.01); *G06V 10/758* (2022.01); *G06V 30/147* (2022.01)

(58) Field of Classification Search
CPC .......... G06V 30/1444–158; G06V 20/62–635; G06V 10/758; G06V 30/147; G06T 7/143; G06T 7/187
See application file for complete search history.

(56) References Cited

U.S. PATENT DOCUMENTS

| | | | |
|---|---|---|---|
| 2006/0150087 A1* | 7/2006 | Cronenberger | G06F 40/169 707/E17.082 |
| 2014/0297256 A1* | 10/2014 | Rogowski | G06V 30/414 704/2 |
| 2017/0243228 A1* | 8/2017 | Wang | G06F 11/34 |
| 2019/0102643 A1* | 4/2019 | Furukawa | G06T 7/11 |

* cited by examiner

Primary Examiner — Casey L Kretzer
(74) Attorney, Agent, or Firm — MUNCY, GEISSLER, OLDS & LOWE, P.C.

(57) ABSTRACT

An automatically detecting method for time-varying text region of interest is disclosed. The automatically detecting method is adapted to an image processing unit of an information retrieval system, to detect a time-varying text region of interest having specific characters or character set as unit on an operation screen of a manufacturing machine, a processing machine or other equipment; furthermore, the automatically detecting method can be performed based on presence or absence of the historical screen data, and union of the detected region proposals for the time-varying text region of interest, to obtain an automatically labeled and selected time-varying text region of interest. According to the automatically detecting method, the user only needs to confirm whether the required data are labeled and selected, so it is more convenient for the user to setting data, and greatly helpful to reduce the setting time and correctly detect the required information.

13 Claims, 10 Drawing Sheets

AUTOMATICALLY DETECTING METHOD FOR TIME-VARYING TEXT REGION OF INTEREST

BACKGROUND OF THE INVENTION

1. Field of the Invention

The present invention provides an automatically detecting method for time-varying text region of interest, and more particularly to a detecting method adapted to an information retrieval system to automatically select and label a time-varying text region of interest within the operation screen accurately, to enable the user to set data more conveniently, and the automatically detecting method is greatly helpful to reduce the user's operation time for setting data and correctly detect the required information.

2. Description of the Related Art

With the current rapid development of information technology and the internet, the great increase in computing capability, and continuous improvement in data collection and storage technology, a great amount of data is accumulated, recorded and retrieved rapidly, so that the equipment with a higher processing speed and an open architecture should be applied in the automated production line technology to meet the use requirements.

The various parameters generated by the conventional factory manufacturing machine during the manufacturing process are displayed on the screen, and when the parameter reaches a preset warning status, the signal light is emitted to remind the staffs on site, that is, someone is required to stay around the manufacturing machine to deal with emergencies. If it is necessary to collect the parameters displayed on the screen, someone is required to copy the parameters regularly. Therefore, in order to solve the above-mentioned problems, some companies use an information retrieval system to retrieve the screen of the machine and equipment and analyze the information displayed on the screen, so as to perform the customized or systematic analysis (or statistics) and warning settings.

Under a condition that a lot of information are displayed on the screen of the machine, in order for the information retrieval system to analyze the information on the screen effectively and quickly, an user must label and select region of interest (ROI) through an user interface of the machine software to provide the specific to-be-analyzed region to information retrieval system. However, the conventional method of manually labeling and selecting the region to be recognized has following problems.

When there are too many items to be recognized on the screen of the machine, the user must manually label and select many time-varying text regions of interest (or called dynamic and static text region in which content varies over time), and it is time-consuming for the user to label and select the time-varying text regions of interest in the setting mode. If the labeled region is too large and contains too much unnecessary information, or the labeled region is too small to contain the required information, or the labeled region is incorrect or wrong due to the unknown length of the text region of interest (for example, the text may be displayed in three or five digits), the improper or incorrect label selection results in a decrease in the accuracy of recognition and poor effects and also a waste of computing resources. Furthermore, correctness of the obtained data should be manually verified, and if necessary, the label selection region should be modified, and the above conventional problems waste a lot of time. Although there are many commercially-available methods can automatically detect the text region, most of the algorithms of them still label and select the time-varying text regions of interest containing too much unnecessary information, or fail to correctly detect the necessary information.

When big data applications are developed in industrial production machines, the primary task is to collect information about the relevant machines on the production line machines (or called the cloud ends). Most of the important information comes from the user interface of the machine software. Therefore, if the time-varying text region of interest displayed on the screen of the machine can be automatically labeled and selected accurately, it is more convenient for the user to set data and greatly helpful to reduce the uses setting time, and the required information can be detected correctly; furthermore, automatically detecting text ROI is also beneficial for system integration engineers to collect and analyze data related machine parameter setting during script editing. Therefore, how to automatically detect the text ROI accurately is a key issue in the industry.

SUMMARY OF THE INVENTION

In order to solve the conventional problems, the inventors develop an automatically detecting method for time-varying text region of interest, according to collected data through multiple evaluations and considerations, and years of experience of trial production and modification in the industry.

The primary objective of the present invention lies in that the image processing unit of the information retrieval system can be used to detect the time-varying text region of interest having specific characters or character set as an unit on the operation screen of a manufacturing machine, processing machine or other equipment; furthermore, the automatically detecting method can be performed based on presence or absence of the historical screen data, and union of the detected region proposals for the time-varying text region of interest, to obtain the automatically labeled and selected time-varying text region of interest. The above-mentioned embodiments of the automatically detecting method can be performed individually, cooperatively, or integratedly, so that the user can select the performing manner according to the status of the operation screen, to automatically and accurately label and select the time-varying text region of interest. Since the user only needs to confirm whether the required data is labeled and selected, it is more convenient for the user to setting data, and greatly helpful for the user to reduce the setting time and correctly detect the required information.

The secondary objective of the present invention lies in that the automatically detecting method includes to load a specific character definition file, wherein the specific character definition file includes characters or a character set for the user to perform addition, deletion or modification; furthermore, the automatically detecting method performs the specific character detection on the image within the operation screen, expands the bounding box of each detected specific text region of interest to generate a search window, converts the image within the search window to a grayscale image, performs vertical or horizontal projection-based search and the Hough transform process on the grayscale image to detect the time-varying text and input box within the grayscale image, and merge the region proposals for the time-varying text region of interest, so as to obtain the time-varying text region of interest.

Another objective of the present invention is that the automatically detecting method is to determine whether there is historical screen data, and if there is no historical screen data, an image is retrieved from the operation screen and converted into the grayscale image as a base image, and after another image is retrieved and converted into the grayscale image, the pixel location greater than the specific threshold value is mapped to the score map to perform accumulated vote actions based on the differential computation result of the grayscale image and the base image; if there is the historical screen data, an image is loaded from the historical image database to serve as the base image, the differential computation is performed on the base image and the grayscale image retrieved from the historical screen data, and the pixel location greater than the specific threshold value is mapped to the score map to perform accumulated vote actions based on the differential computation result; the accumulated score map can be normalized, and image connection process is performed on the score map, the bounding boxes of the connected blocks within the image are computed, the overlapped ones of the bounding boxes are merged, the bounding box of the specific text region of interest is expanded to obtain region proposals for the time-varying text region of interest, the union operation is performed on the obtained region proposals, so as to obtain the automatically labeled and selected time-varying text region of interest.

Another objective of the present invention is that, in the automatically detecting method, the information retrieval system initializes the parameter and then performs the detection process on the machine screen to detect the time-varying text region of interest having the specific characters or character set as the unit, to obtain the region proposals for the time-varying text region of interest through the detection process, and after above-mentioned process is completed, it waits for completion of the accumulation and vote process based on presence or absence of the historical screen data; regardless of whether there is a historical screen data, a result will be obtained after the whole vote process is completed, according to the result of the accumulation and vote process, the region proposals for the time-varying text region of interest can be obtained, and the union operation can be performed on the region proposals to obtain the automatically labeled and selected time-varying text region of interest.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
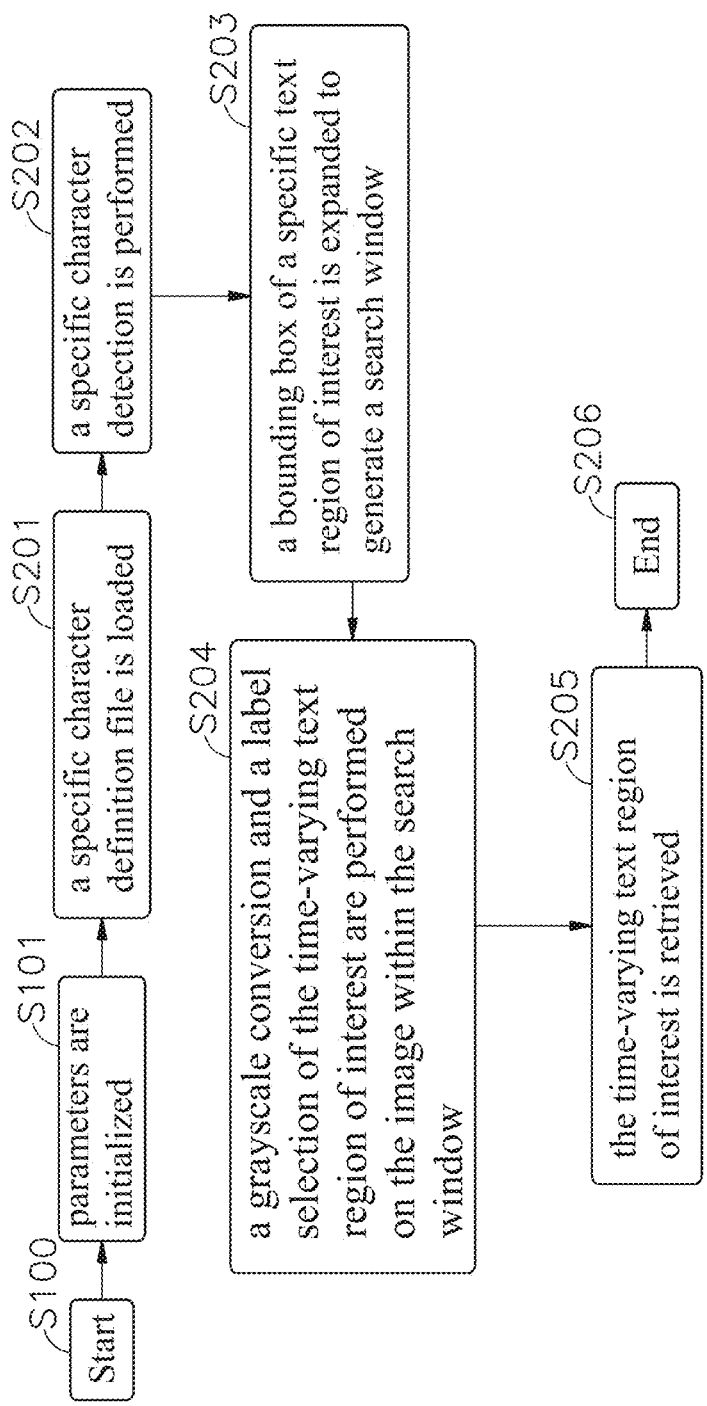
FIG. 1 is a flowchart of a first preferred embodiment of the present invention.
Figure 2:
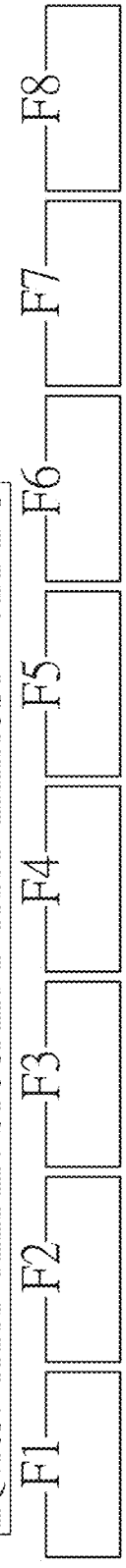
FIG. 2 is a schematic view of a machine screen according to the present invention.
Figure 3:
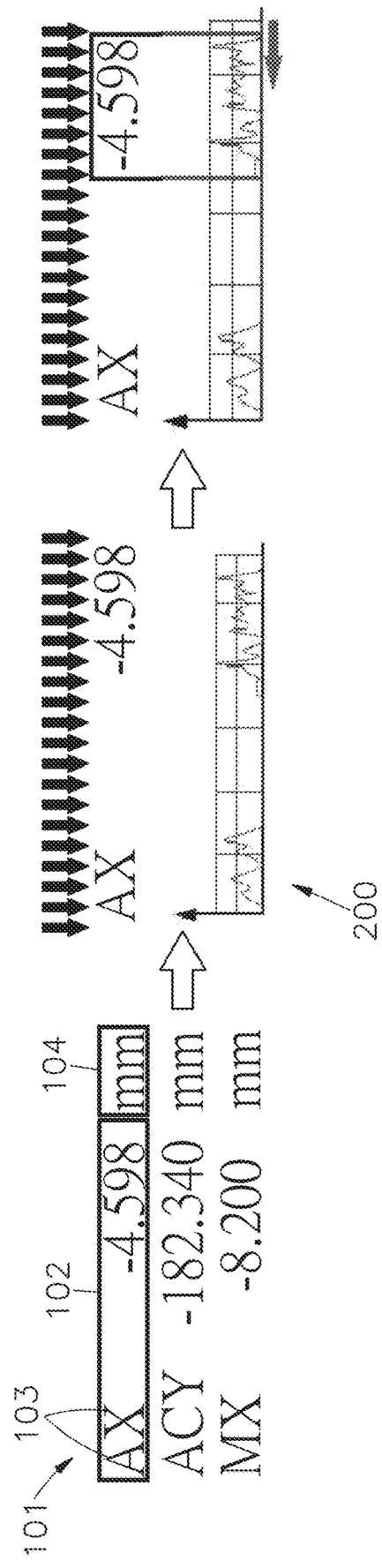
FIG. 3 is a schematic view of an operation to perform projection-based search on the image within the search window to select the time-varying text region of interest, according to the present invention.
Figure 4:
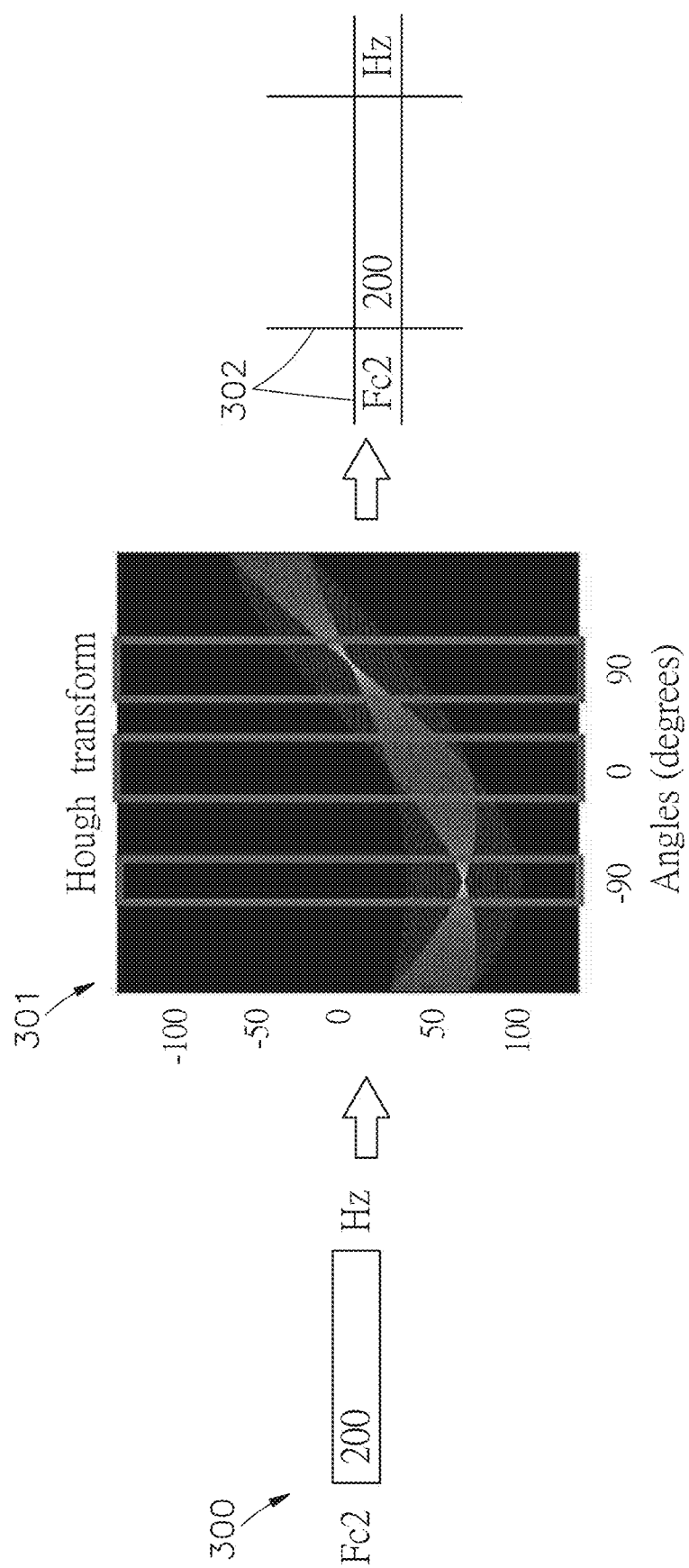
FIG. 4 is a schematic view of an operation to perform inverse Hough transform on the image within the search window to obtain the time-varying text region of interest, according to the present invention.

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

Please refer to FIGS. 1 to 4, which are a flowchart of a first preferred embodiment, a schematic view of a machine screen, a schematic view showing an operation to perform projection-based search on the image within the search window to select the time-varying text region of interest, and a schematic view showing an operation to perform inverse Hough transform on the image within the search window to obtain the time-varying text region of interest, according to the present invention, respectively. As shown in FIGS. 1 to 4, the automatically detecting method for time-varying text region of interest of the present invention can be adapted to an information retrieve system built-in or externally connected to, for example but not limited to, a manufacturing machine, a processing machine or other devices. The machine provides an operation screen 100 on a display screen thereof, to present various parameters or data related to an operating and manufacturing state of the machine. The information retrieval system comprises an image processing unit which can be performed by, for example but not limited to, an FPGA, application software, or other intermediate software or hardware. The image processing unit detects and compares specific characters or character set, and matches and compares with the status of time-varying image including historical screen data or a real-time image, so as to automatically detect the text region of interest. In this embodiment, the automatically detecting method includes following steps.

In a step (S100), the flow of the automatically detecting method starts.

In a step (S101), parameters are initialized, and a step (S201) is performed.

In a step (S201), a specific character definition file is loaded.

In a step (S202), a specific character detection is performed.

In a step (S203), a bounding box of a specific text region of interest is expanded to generate a search window.

In a step (S204), a grayscale conversion and a label selection of the time-varying text region of interest are performed on the image within the search window.

In a step (S205), the time-varying text region of interest is retrieved.

In a step (S206), the automatically detecting method is completed.

According to FIGS. 1 to 4 and the aforementioned implementation steps, after the information retrieval system of the present invention starts, the information retrieval system initializes the parameters including, for example, the parameter for selecting the image source of the host, setting image resolution, and the specific character definition file is loaded. The specific character definition file may be a character list for searching and predefined by the user, and the specific character definition file may include uppercase and lowercase letters, spaces, numbers, punctuation marks and other symbols or a character set of the above-mentioned elements. The content of the character list can be added, deleted or modified by the user according to the specific text region possibly displayed on the operation screen. Depending on the loaded specific character or character set, the text region detection can be performed by the existing detecting manner, for example but not limited to, optical character recognition (OCR) algorithm, pattern comparison, color similarity, texture, morphology feature related methods, long short-term memory (LSTM) OCR, object detection in deep learning such as single shot multi-box detector (SSD) or you only look once (YOLO). The above-mentioned manners are unable to determine if the detected region is a region with time-varying text 102, but can provide detecting position information of the specific character or character set, for example, the position information may indicate the specific text region of interest.

After the specific text region of interest is obtained, a tolerance value for expansion of a bounding box height of the specific text region of interest can be defined for each specific text region of interest, and the bounding box height of the specific text region of interest can be used as a height of the search window 101; the leftmost or rightmost bounding box of each region of interest can also be expanded leftwardly or rightwardly by a width tolerance value, respectively, and the bounding box width of the region of interest can be used as the width of the search window 101, and the height tolerance value and the width tolerance value can be set as preset values or be adjusted by the user. It should be noted that the search window 101 is a region of interest or a region proposal where the time-varying text possibly appears.

In this embodiment, each search window 101 is converted to grayscale from color space to form a grayscale image, the time-varying text region of interest is labeled and selected within each search window 101, and the vertical or horizontal projection-based search and the Hough transform process are performed on the converted grayscale image. The projection-based search is based on a condition that the time-varying text 102 is generally located between the attribute 103 and the unit 104, for example, the attribute such as AX, ACY, MX, are descriptions of the values of −4.598, −182.340, −8.200 in the region of interest. The unit of mm is a specific character set. The obtained grayscale image within the search window 101 can be vertically or horizontally projected and transformed to a histogram 200. The vertical projection is taken as an example for illustration, the horizontal axis represents the width of the search window 101 and the vertical axis represents the projection value of the grayscale image. Then, the region with the projection value is searched, in an order from right to left (such as the direction pointed by the horizontal arrow in FIG. 3), in the histogram 200, and when the amount of the consecutive non-zero projection values (or the consecutive projection values each of which is lower than a certain preset value) on the left side of a certain point of the curve reaches a certain tolerance value, it can be determined that the certain point is at the bounding box region of the attribute 103 and the region of interest, and the detected width is used as the width of the time-varying text region of interest 201, and the height of the bounding box region is equal to the height of the search window 101, so that the region proposals for the time-varying text region of interest 201 can be automatically labeled and selected. The process of the horizontal projection-based search is also the same as that of the vertical projection-based search, and the projection direction can be an option for the user to select according to the text direction in the operation screen.

The Hough transform is used to detect an input box 300 for text input within the time-varying text region of interest 201 on the operation screen. The input box 300 has obvious bounding box information, so that the projection-based search may label the time-varying text region of interest 201 having the width no equal to the width of the input box 300. The bounding box feature can be used for detection based on the Hough transformation, the processing flow is to first perform edge detection on the search window 101 to retrieve the bounding box information for computation, and then transform the bounding box information to an accumulator map 301 of the Hough transform; by setting thresholds, the lines 302 can be reconstructed by the high score points in a specific angle ranges, such as about −90 degrees, 0 degrees, and 90 degrees, and the crossover points of the four reconstructed lines can be used to calculate the rectangular hounding box with a size equivalent to the size of the input box 300, so as to obtain region proposals for the time-varying text region of interest. Next, the region proposals detected by vertical or horizontal projection-based search and the Hough transform are merged to obtain the automatically labeled and selected time-varying text region of interest.

Figure 5:
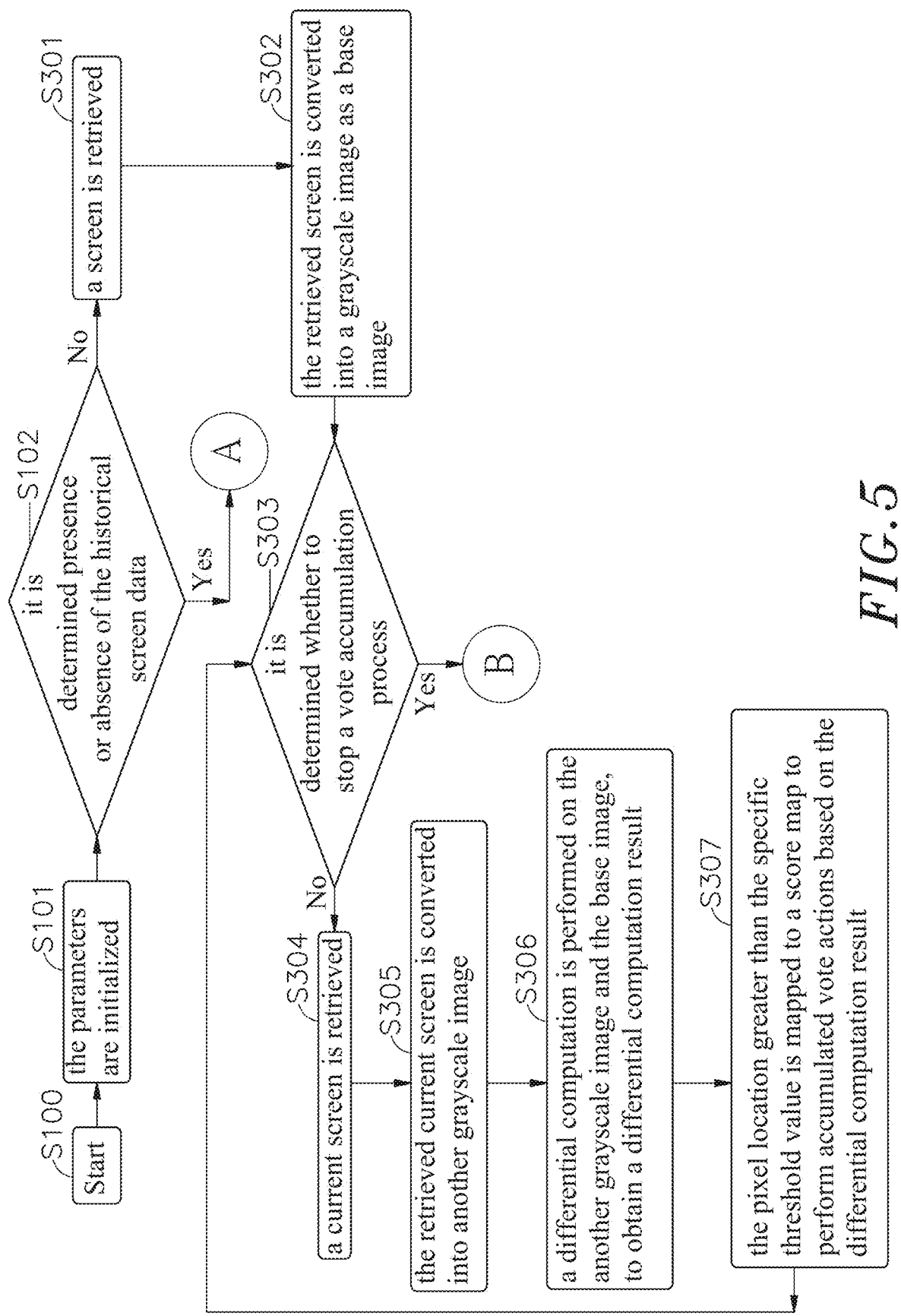
FIG. 5 is a first flowchart of a second preferred embodiment of the present invention.
Figure 6:
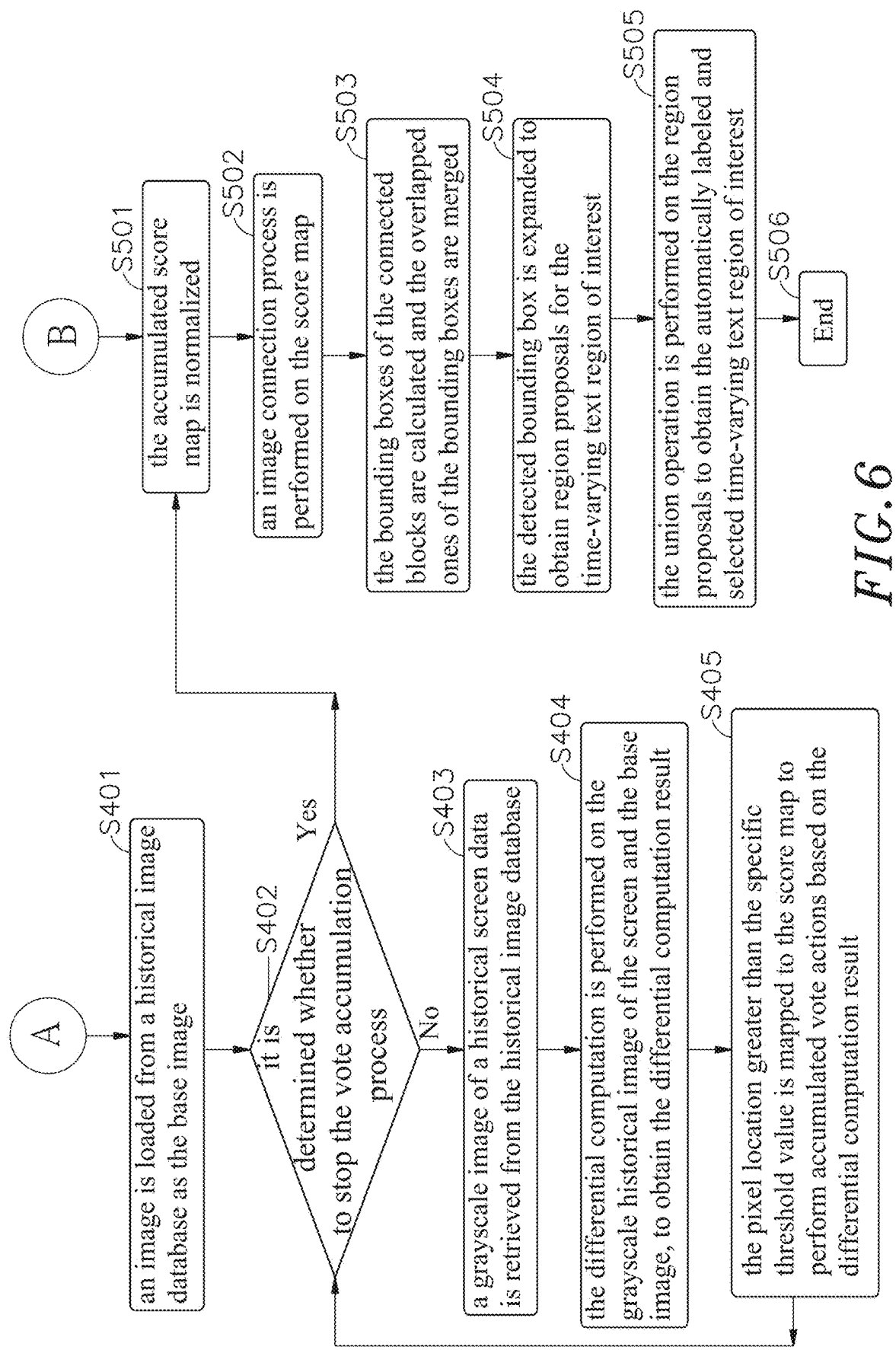
FIG. 6 is a second flowchart of the second preferred embodiment of the present invention.
Figure 7:
FIG. 7 is a schematic view showing an operation to perform the union and voting operation on the detected region proposals to automatically label and select the time-varying text region of interest based on presence or absence of the historical screen data, according to the present invention.

Please refer to FIGS. 5 to 7, which are first flowchart and second flowchart of the second preferred embodiment of the present invention, and a schematic view showing an operation to perform a union and voting operation on the detected region proposals based on the presence or absence of the historical screen data to automatically select and label the time-varying text region of interest. As shown in FIGS. 5 to 7, the automatically detecting method for time-varying text region of interest of the present invention includes the following steps In a step (S100), the automatically detecting method starts.

In a step (S101), the parameters are initialized.

In a step (S102), it is determined presence or absence of the historical screen data, if the presence of the historical screen data is determined, a step (S401) is performed; otherwise, a step (S301) is performed.

In a step (S301), a screen is retrieved.

In a step (S302), the retrieved screen is converted into a grayscale image as a base image.

In a step (S303), it is determined whether to stop a vote accumulation process, if yes, a step (S501) is performed; otherwise, a step (S304) is performed.

In a step (S304), a current screen is retrieved.

In a step (S305), the retrieved current screen is converted into another grayscale image.

In a step (S306), a differential computation is performed on the another grayscale image and the base image, to obtain a differential computation result.

In a step (S307), the pixel location greater than the specific threshold value is mapped to a score map to perform accumulated vote actions based on the differential computation result, and the step (S303) is repeated.

In a step (S401), an image is loaded from a historical image database as the base image.

In a step (S402), it is determined whether to stop the vote accumulation process, if yes, the step (S501) is performed; otherwise, a step (S403) is performed.

In a step (S403), a grayscale image of a historical screen data is retrieved from the historical image database.

In a step (S404), the differential computation is performed on the grayscale historical image of the screen and the base image, to obtain the differential computation result.

In a step (S405), the pixel location greater than the specific threshold value is mapped to the score map to perform accumulated vote actions based on the differential computation result, and the step (S402) is repeated.

In a step (S501), the accumulated score map is normalized.

In a step (S502), an image connection process is performed on the score map.

In a step (S503), the bounding boxes of the connected blocks are calculated and the overlapped ones of the bounding boxes are merged.

In a step (S504), the detected bounding box is expanded to obtain region proposals for the time-varying text region of interest.

In a step (S505), the union operation is performed on the region proposals to obtain the automatically labeled and selected time-varying text region of interest.

In a step (S506), the automatically detecting method is completed.

According to FIGS. 5 to 7 and the aforementioned implementation steps, the present invention may select the different automatically detecting method based on presence or absence of the historical screen data. If there is no historical data of the machine operation screen, and the data of the screen must be collected firstly, wherein the processing flow is to retrieve a base screen, and convert the retrieved screen into a grayscale image (that is, the image of the retrieved screen is converted to grayscale from color space). The grayscale image can be regarded as a base image 400, and the base image 400 is stored in a historical image database, and another current screen is continuously retrieved to perform the following vote accumulation process.

When it is determined to continue the vote accumulation process, a current screen is retrieved from the operation screen of the machine and converted into the grayscale image, and the converted grayscale image is stored as the historical screen data in the historical image database. Next, in the following vote accumulation process, the differential computation is performed on the pixels of each corresponding block of the grayscale image and the base image 400 to obtain a differential computation result. According to the differential computation result, the pixel having the difference higher than a certain threshold is determined as a variable pixel, and the variable pixels are mapped to the corresponding positions on the score map to perform accumulated vote actions based on the differential computation result, and then repeat the above vote accumulation process until it is determined to stop the whole vote accumulation process.

When it is determined that there is the historical screen data, the data of the screen collected in the past is used to perform detection, and this step can be regarded as an offline detection for the time-varying text region of interest. The above processing flow is to load an image from the historical image database as the base image 400, and then retrieve a grayscale image of a historical screen data from the historical image database, and perform the differential computation on the pixels of each corresponding block of the grayscale historical image of the screen and the base image 400, to obtain the differential computation result. According to differential computation result, the pixel having the difference higher than a certain threshold is determined as a variable pixel, and the variable pixels are mapped to the corresponding positions on the score map to perform accumulated vote actions based on the differential computation result, the above operations are continuously performed until it is determined to stop the whole vote accumulation process.

After the above vote accumulation process is completed under presence of historical screen data and absence of historical screen data, the accumulated score map is normalized, so that the pixel values of grayscale image can be binarized to a range of 0 to 1, wherein 0 represents black and 1 represents white, and the normalized score map 401 can be obtained. Next, the blob analysis for image connection processing is performed on the normalized score map 401 and high score blobs are extracted to obtain the image 402 which is processed with image connection. Furthermore, before the image connection processing, the user can also perform additional filtering process, such as the dilation or closing process based on the morphology, so as to remove the low score blobs. Next, the bounding boxes of the connected blobs can be calculated, the overlapped ones of the bounding boxes are merged, and the obtained bounding box is expanded in up, down, left, and right directions, thereby expanding a bounding box of the specific text region of interest. The appropriate range for expansion can be defined by the user, to obtain the region proposals for the time-varying text region of interest, as shown in the image 403. Next, the union operation is performed on the region proposals to obtain the automatically labeled and selected time-varying text region of interest, as shown in the image 404.

Figure 8:
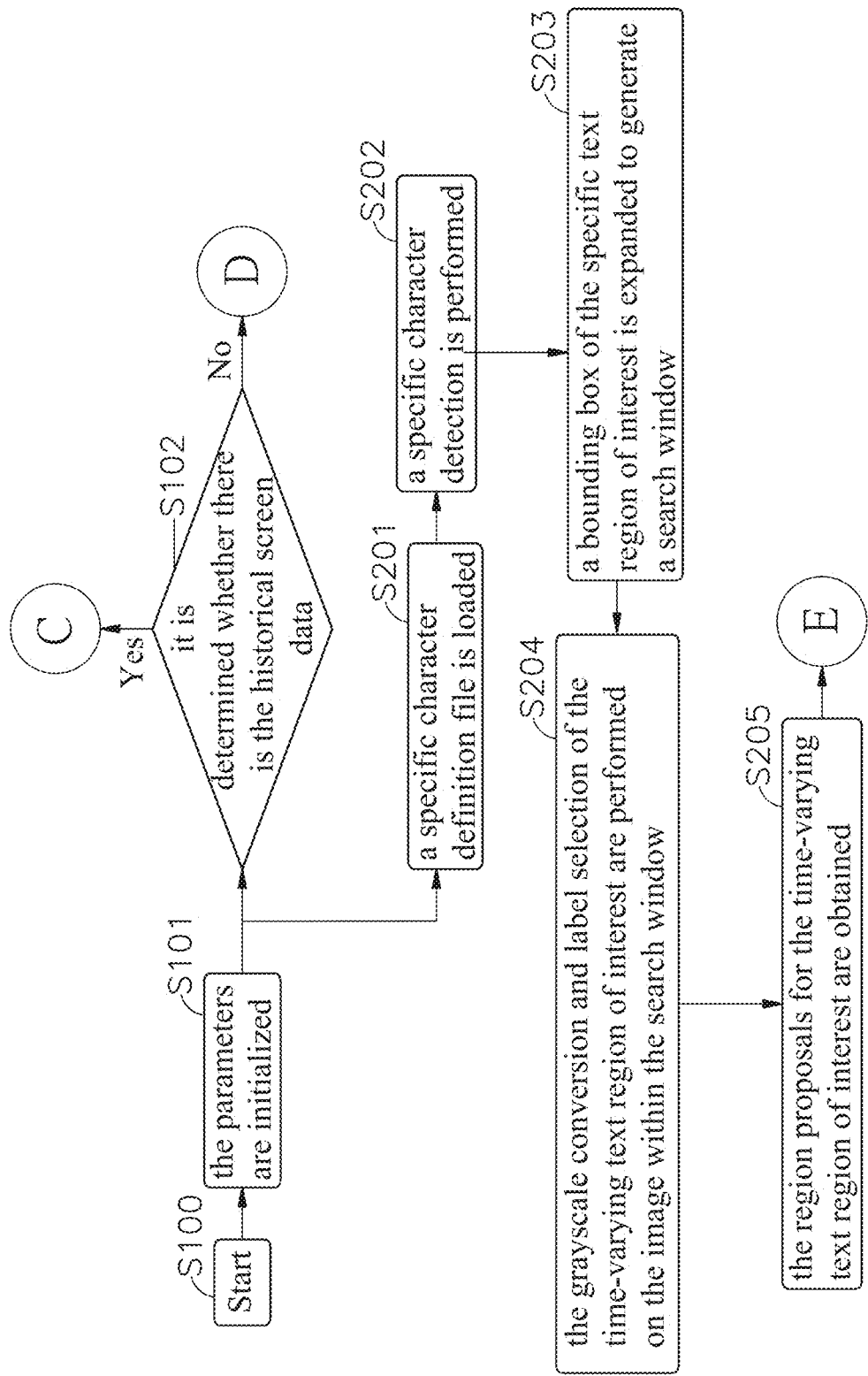
FIG. 8 is a first flowchart of a third preferred embodiment of the present invention.
Figure 9:
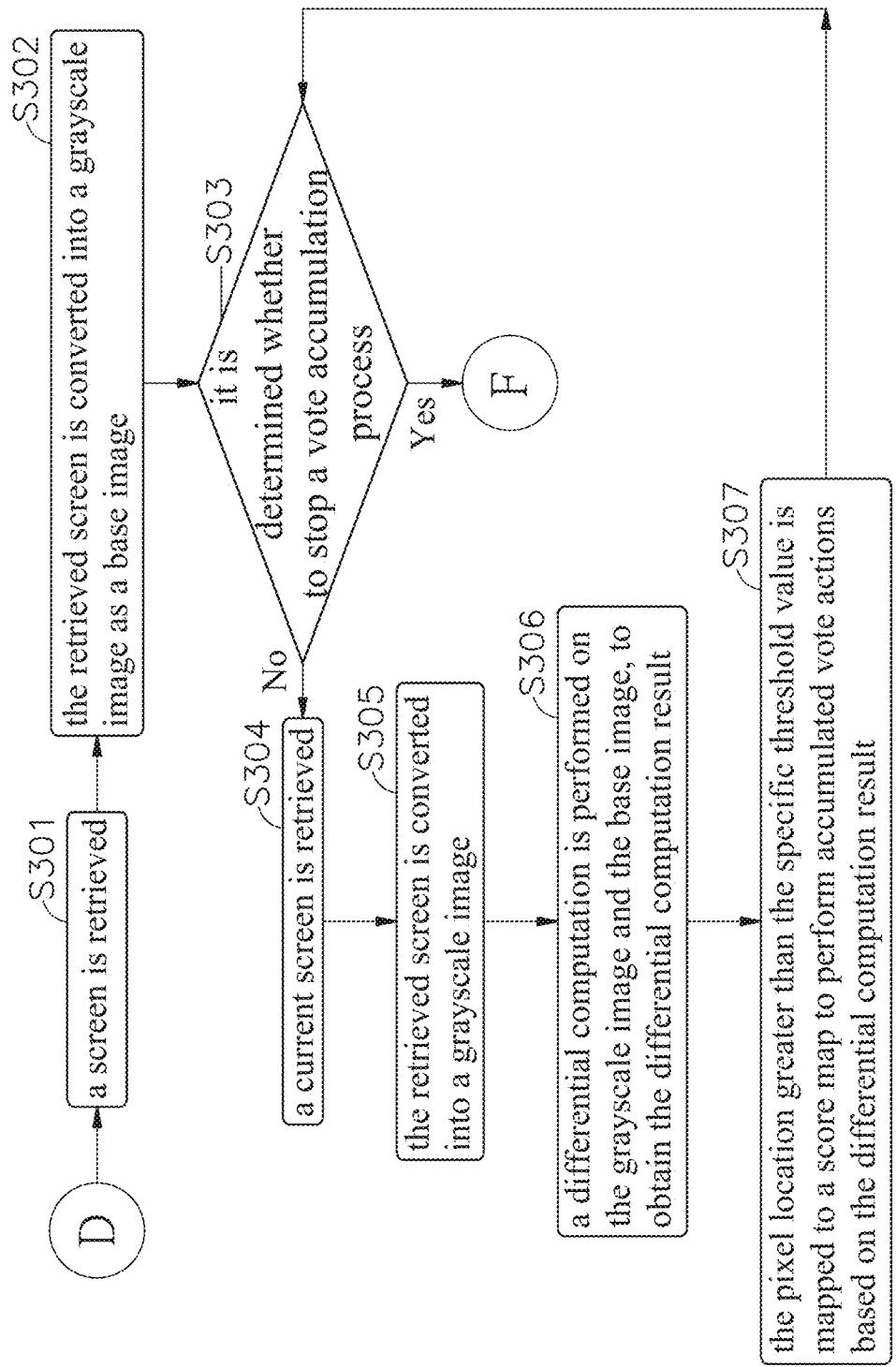
FIG. 9 is a second flowchart of the third preferred embodiment of the present invention.
Figure 10:
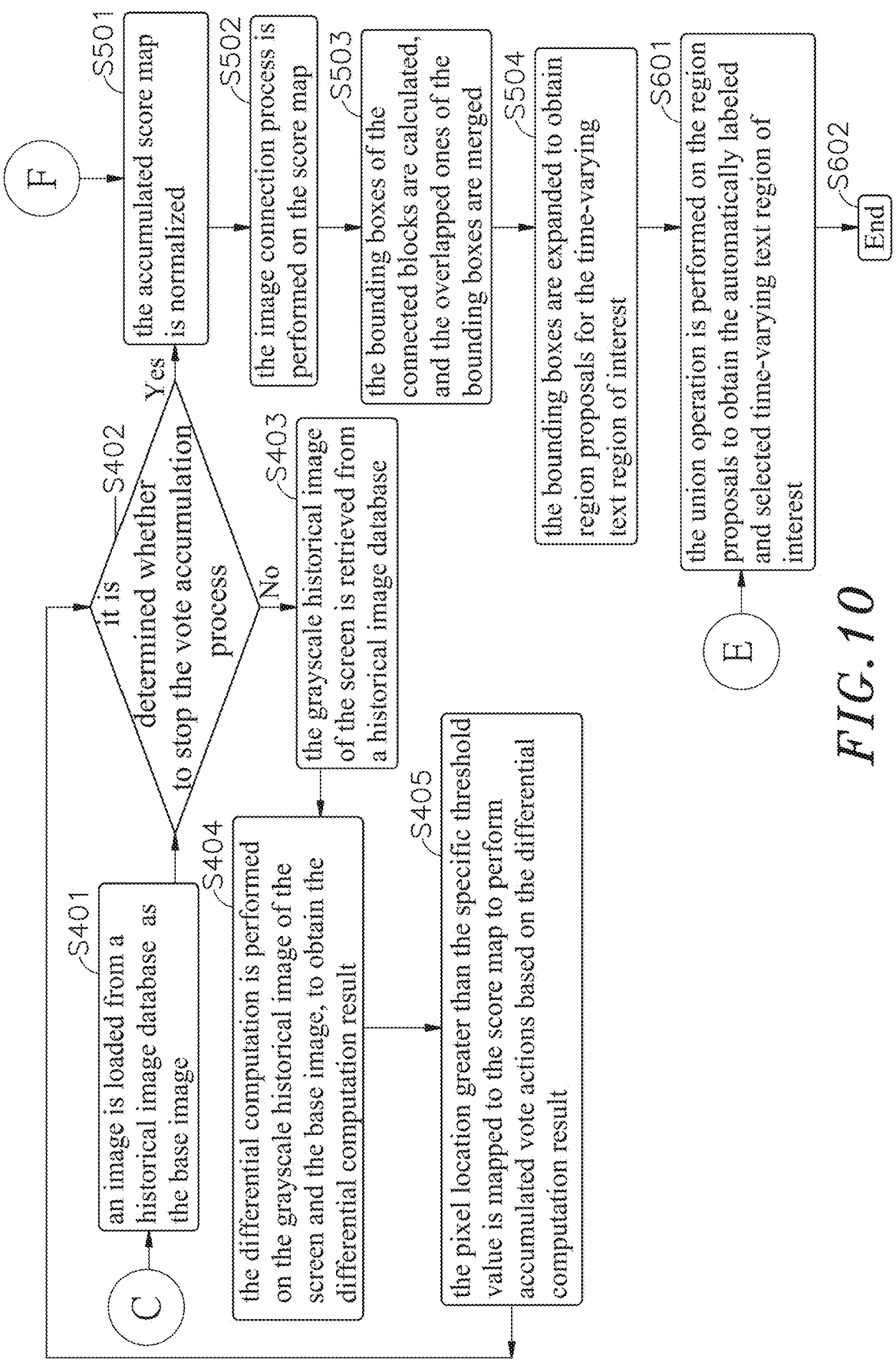
FIG. 10 is a third flowchart of a third preferred embodiment of the present invention.

Please refer to FIGS. 8 to 10, which are first flowchart, second flowchart and third flowchart of a third preferred embodiment of the present invention, respectively. As shown in FIGS. 8 to 10, the automatically detecting method for time-varying text region of interest of the present invention includes the following steps.

In a step (S100), the automatically detecting method starts.

In a step (S101), the parameters are initialized, and steps (S102) and (S201) are performed.

In a step (S102), it is determined whether there is the historical screen data, if there is the historical screen data, a step (S401) is performed; otherwise, a step (S301) is performed.

In a step (S201), a specific character definition file is loaded.

In a step (S202), a specific character detection is performed.

In a step (S203), a bounding box of the specific text region of interest is expanded to generate a search window.

In a step (S204), the grayscale conversion and label selection of the time-varying text region of interest are performed on the image within the search window.

In a step (S205), the region proposals for the time-varying text region of interest are obtained, and a step (S601) is performed.

In a step (S301), a screen is retrieved.

In a step (S302), the retrieved screen is converted into a grayscale image as a base image.

In a step (S303), it is determined whether to stop a vote accumulation process, if yes, a step (S501) is performed; otherwise, a step (S304) is performed.

In a step (S304), a current screen is retrieved.

In a step (S305), the retrieved screen is converted into a grayscale image.

In a step (S306), a differential computation is performed on the grayscale image and the base image, to obtain the differential computation result.

In a step (S307), the pixel location greater than the specific threshold value is mapped to a score map to perform accumulated vote actions based on the differential computation result, and the step (S303) is repeated.

In a step (S401), an image is loaded from a historical image database as the base image.

In a step (S402), it is determined whether to stop the vote accumulation process, if yes, a step (S501) is performed; otherwise, a step (S403) is performed.

In a step (S403), the grayscale historical image of the screen is retrieved from a historical image database.

In a step (S404), the differential computation is performed on the grayscale historical image of the screen and the base image, to obtain the differential computation result.

In a step (S405), the pixel location greater than the specific threshold value is mapped to the score map to perform accumulated vote actions based on the differential computation result, the step (S402) is repeated.

In a step (S501), the accumulated score map is normalized.

In a step (S502), the image connection process is performed on the score map.

In a step (S503), the bounding boxes of the connected blocks are calculated, and the overlapped ones of the bounding boxes are merged.

In a step (S504), the bounding boxes are expanded to obtain region proposals for time-varying text region of interest, and a step (S601) is performed.

In a step (S601), the union operation is performed on the region proposals to obtain the automatically labeled and selected time-varying text region of interest.

In a step (S602), the automatically detecting method is completed.

According to FIGS. 8 to 10 and the aforementioned implementation steps, the steps (S201)~(S205) of the first preferred embodiment of the present invention are for the process of detecting the time-varying text region of interest, having the specific characters or character set as unit, displayed on the machine screen, and after the region proposals for the time-varying text region of interest are obtained, it waits for completion of the steps (S501)~(S504) of the second preferred embodiment for the accumulating and voting process for image in space, to obtain another region proposals for the time-varying text region of interest, and the union operation are performed on the above-mentioned region proposals to obtain the automatically labeled and selected time-varying text region of interest.

The present invention mainly provides the automatically detecting method for time-varying text region of interest, and the automatically detecting method is adapted to the image processing unit of the information retrieval system to detect the time-varying text region of interest 201 having specific characters or character set as unit, displayed on the operation screen 100 of the manufacturing machine, a processing machine or other equipment; for example, the character or character set can indicate a size (such as cm or mm), temperature (° C.) or pressure (N/m2), but the present invention is not limited to these examples. Furthermore, the automatically detecting method can be performed based on determination for presence or absence of the historical screen data, and the detection for the region proposals for the time-varying text region of interest (as shown in the image 403), and the union operation is performed on the individual region proposals to obtain the automatically labeled and selected time-varying text region of interest (as shown in the image 404), the aforementioned automatically detecting method can be performed individually, cooperatively or integratedly, so that the user can select the performing manner according to the status of the operation screen 100, to accurately label and select the time-varying text region of interest automatically (as shown in the image 404), and the user only needs to confirm whether the required data are labeled and selected, so that it is more convenient for the user to setting data, greatly helpful for the user to reduce the setting time and correctly detect the required information. Besides, the method of automatically detecting the ROI is also beneficial for system integration engineers to collect and analyze data related to machine parameter setting during script editing.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. An automatically detecting method for time-varying text region of interest, adapted to an information retrieval system comprising an image processing unit configured to detect an image of an operation screen to automatically label a time-varying text region of interest, wherein the image comprises historical screen data or a real-time image, and the automatically detecting method comprising:

(B01) determining whether there is the historical screen data, and perform a step (B09) if yes, otherwise, performing a step (B02);

(B02) retrieving a screen from the operation screen;

(B03) converting the retrieved screen into a grayscale image as a base image, performing differential computation between pixels of each block of the base image, so as to obtain a differential computation result, according to the differential computation result, a pixel is determined as a variable pixel, mapping a pixel location of the pixel to perform accumulated vote actions on a score map based on the differential computation result;

(B04) determining whether to stop a vote accumulation process, and perform a step (B14) if yes, otherwise, performing a step (B05);

(B05) retrieving a current screen from the operation screen;

(B06) converting the retrieved current screen into a grayscale current image;

(B07) performing differential computation between pixels of each block of the grayscale current image and the base image, so as to obtain a differential computation result;

(B08) mapping a pixel location greater than a specific threshold value to perform accumulated vote actions on the score map based on the differential computation result, and repeating to perform the step (B04);

(B09) loading another image from a historical image database as a base image or the base image of the step (B03) if the step (B02) is performed as a result of the step (B01);

(B10) determining whether to stop another vote accumulation process, and performing a step (B14) if yes, otherwise, performing a step (B11);

(B11) retrieving a grayscale historical image of the screen from the historical image database;

(B12) performing differential computation between pixels of each block of the grayscale historical image and the base image, so as to obtain the differential computation result;

(B13) mapping a pixel location greater than the specific threshold value to perform accumulated vote actions on the score map based on the differential computation result, and repeating to perform the step (B10);

(B14) performing a normalization process to an accumulated score map;

(B15) performing an image connection process to the accumulated score map;

(B16) computing bounding boxes of each connected block of image within the score map, and merging overlapped bounding boxes together;

(B17) expanding the bounding boxes, so as to obtain region proposals for the time-varying text region of interest; and (B18) performing a union operation on the obtained region proposals, so as to obtain an automatically labeled and selected time-varying text region of interest.

2. The automatically detecting method for time-varying text region of interest according to claim 1, wherein the converted grayscale images in the steps (B03) and (B06) are stored in the historical image database as the grayscale historical images of the screen.

3. The automatically detecting method for time-varying text region of interest according to claim 1, wherein the normalization process in the step (B14) is to binarize values of the pixels of the grayscale image to be in a range of 0 to 1.

4. The automatically detecting method for time-varying text region of interest according to claim 1, wherein the image connection process in the step (B15) is to perform blob analysis on the score map and extract high score blobs.

5. The automatically detecting method for time-varying text region of interest according to claim 1, wherein a filtering process comprises dilation and closing operation based on morphology and is performed to remove low score blocks before the image connection process in the step (B15).

6. An automatically detecting method for time-varying text region of interest, adapted to an information retrieval system comprising an image processing unit configured to detect an image of an operation screen to automatically label a time-varying text region of interest, wherein the image of the operation screen comprises historical screen data or a real-time image, and the automatically detecting method comprises:

(C01) initializing related system parameters, and perform a step (C02);

(C02) determining whether there is the historical screen data, and performing a step (C15) if yes, otherwise, performing a step (C03);

(C03) loading a specific character definition file;

(C04) performing a specific character detection on the image of the operation screen;

(C05) expanding a bounding box of a detected specific text region of interest, to generate a search window;

(C06) performing a grayscale conversion of the image in the search window and labeling a selection of the time-varying text region of interest;

(C07) obtaining region proposals for the time-varying text region of interest, and performing a step (C24);

(C08) retrieving another screen from the operation screen;

(C09) converting the retrieved screen into a grayscale image as a base image;

(C10) determining whether to stop a vote accumulation process, and performing a step (C20) if yes, otherwise, performing a step (C11);

(C11) retrieving a current screen from the operation screen;

(C12) converting the retrieved current screen into a grayscale current image;

(C13) performing differential computation between pixels of each block of the grayscale current image and the base image, so as to obtain a differential computation result;

(C14) mapping a pixel location greater than a specific threshold value to perform accumulated vote actions on a score map based on the differential computation result, and repeating to perform the step (C10);

(C15) loading another image from a historical image database as a base image or the base image of the step (C09) if the step (C08) is performed as a result of the step (C02);

(C16) determining whether to stop another vote accumulation process and performing a step (C20) if yes, otherwise, performing a step (C17);

(C17) retrieving a grayscale historical image of the screen from the historical image database;

(C18) performing differential computation between pixels of each block of the grayscale historical image and the base image, so as to obtain the differential computation result;

(C19) mapping a pixel location greater than the specific threshold value to perform accumulated vote actions on the score map based on the differential computation result, and repeating to perform the step (C16);

(C20) performing normalization process to an accumulated score map;

(C21) performing image connection process to the accumulated score map;

(C22) computing bounding boxes of each connected block of image within the score map, and merging overlapped bounding boxes together;

(C23) expanding the bounding boxes, so as to obtain region proposals for the time-varying text region of interest, and performing a step (C24); and (C24) performing a union operation on the obtained region proposals, to obtain an automatically labeled and selected time-varying text region of interest.

7. The automatically detecting method for time-varying text region of interest according to claim 6, wherein the search window of the step (C05) further comprises:

performing vertical or horizontal projection-based search based on the generated grayscale image and performing a Hough transform process to detect a time-varying text and an input box of the grayscale image, respectively, so as to obtain the region proposals for the time-varying text region of interest; and merging the detected region proposals.

8. The automatically detecting method for time-varying text region of interest according to claim 7, wherein the projection-based search is performed based on a condition that the time-varying text is located between an attribute and an unit, the grayscale image is projected and transformed onto a histogram, and a region, in which consecutive projection values are not zero or lower than a preset value, is searched on the histogram to determine a bounding box region of the attribute and the time-varying text region of interest, and the width of the bounding box region is selected as the width of the time-varying text region of interest, and the height of the bounding box region is equal to the height of the search window.

9. The automatically detecting method for time-varying text region of interest according to claim 7, wherein the Hough transform is configured to perform edge detection on the search window to retrieve bounding box information, transforming the bounding box information to an accumulator map of the Hough transform, and lines are reconstructed by setting the threshold values on the accumulator map, so as to compute the bounding box equal to the input box.

10. The automatically detecting method for time-varying text region of interest according to claim 6, wherein the converted grayscale images in the steps (C09) and (C12) are stored in the historical image database as the grayscale historical images of the screen.

11. The automatically detecting method for time-varying text region of interest according to claim 6, wherein the normalization process in the step (C20) is to binarize values of the pixels of the grayscale image to be in a range of 0 to 1.

12. The automatically detecting method for time-varying text region of interest according to claim 6, wherein the image connection process in the step (C21) is to perform blob analysis on the score map and extract high score blobs.

13. The automatically detecting method for time-varying text region of interest according to claim 6, wherein a filtering process comprises dilation and closing operation based on morphology and is performed to remove low score blocks before the image connection process in the step (C21).

* * * * *